US010270075B2

(12) United States Patent
Arora et al.

(10) Patent No.: US 10,270,075 B2
(45) Date of Patent: Apr. 23, 2019

(54) SEPARATOR HAVING ADHESIVE LAYER, MANUFACTURING METHOD OF THE SAME, AND ELECTROCHEMICAL DEVICE HAVING THE SAME

(71) Applicant: E I DU PONT DE NEMOURS AND COMPANY, Wilmington, DE (US)

(72) Inventors: Pankaj Arora, Chesterfield, VA (US); Jacob L. Jones, North Chesterfield, VA (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 317 days.

(21) Appl. No.: 15/153,280

(22) Filed: May 12, 2016

(65) Prior Publication Data
US 2017/0012266 A1    Jan. 12, 2017

Related U.S. Application Data

(60) Provisional application No. 62/190,384, filed on Jul. 9, 2015.

(51) Int. Cl.
*H01M 2/16* (2006.01)
*H01M 10/052* (2010.01)
*H01M 2/14* (2006.01)
*H01M 10/0525* (2010.01)

(52) U.S. Cl.
CPC ......... *H01M 2/1686* (2013.01); *H01M 2/145* (2013.01); *H01M 2/162* (2013.01); *H01M 2/1666* (2013.01); *H01M 10/052* (2013.01); *H01M 10/0525* (2013.01)

(58) Field of Classification Search
None
See application file for complete search history.

(56) References Cited

U.S. PATENT DOCUMENTS

| 7,618,579 B2 | 11/2009 | Kim et al. |
| 2005/0006773 A1 | 1/2005 | Hattori |
| 2011/0014320 A1 | 1/2011 | Zable |
| 2012/0183862 A1 | 7/2012 | Gupta et al. |

FOREIGN PATENT DOCUMENTS

| EP | 1507299 A2 | 2/2005 |
| WO | 03/030284 A1 | 4/2003 |

OTHER PUBLICATIONS

International Search Report dated Oct. 6, 2016, for Intl. Application No. PCT/US2016/041050, filed Jul. 6, 2016, ISA European Patent Office, Authorized officer Marcello Battistig.

*Primary Examiner* — Wyatt P McConnell
(74) *Attorney, Agent, or Firm* — E I Du Pont De Nemours and Company

(57) ABSTRACT

A heat-resistant separator contains a porous film, a polymeric fibrous layer adhesively bonded to the surface of the porous film, and an adhesive binder layer located between the porous film and the fibrous layer and covering at least a portion of the surface of the porous film. The fibrous layer contains fibers manufactured of a polyimide wherein the fibers of a form of polyimide comprise fibers with a majority of fibers having diameters in the range of 1-3000 nm. In one of the embodiment the binder layer contains sodium carboxymethylcellulose, and the amount of adhesive present between the porous film and the fibrous web in the final product is within the range of 0.30 grams per square meter of covered surface of porous film to 0.90 grams per square meter of covered surface of porous film.

8 Claims, 1 Drawing Sheet

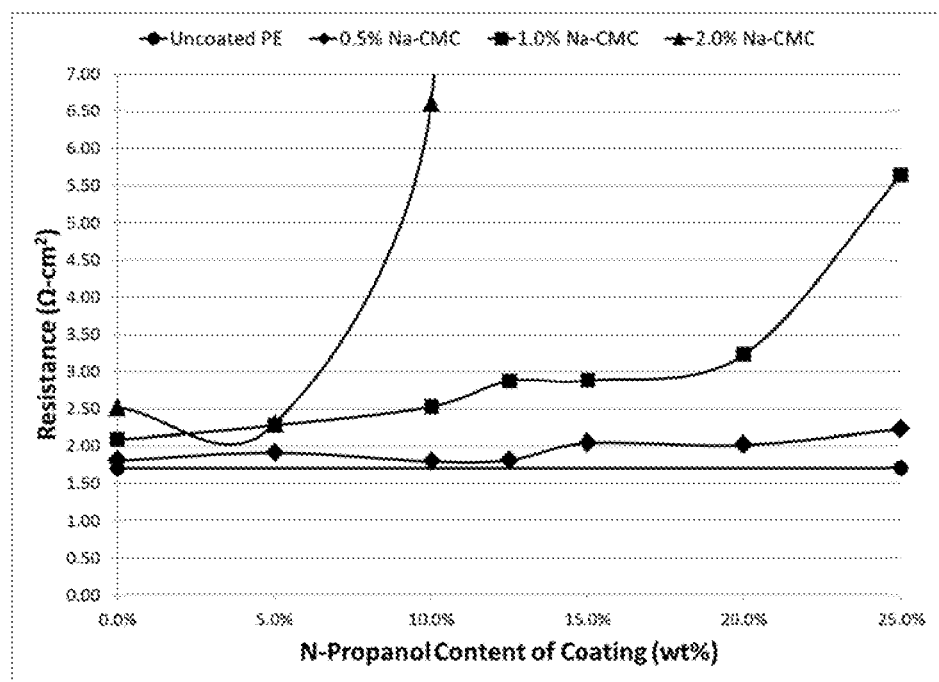

SEPARATOR HAVING ADHESIVE LAYER, MANUFACTURING METHOD OF THE SAME, AND ELECTROCHEMICAL DEVICE HAVING THE SAME

FIELD OF THE INVENTION

The present invention relates to a separator used for an electrochemical device such a lithium primary battery or a lithium secondary battery, a manufacturing method of the same, and an electrochemical device having the same.

BACKGROUND

An important practical aspect of modern energy storage devices is ever-increasing energy density and power density. Safety has been found to be a major concern. Lithium ion cells currently in wide-spread commercial use are among the highest energy density batteries in common use and require multiple levels of safety devices, including external fuses and temperature sensors, that shut down a cell in case of overheating before a short circuit can occur as a result of the mechanical failure of the battery separator. Lithium-ion (Li-ion) batteries are also subject to explosion and fire should a short circuit occur because of mechanical or thermal failure of the separator. Li-ion secondary batteries present special challenges concerning durability over many cycles of charge and discharge. Commercially available Li-ion batteries typically employ microporous polyolefin (for example polypropylene or polyethylene) as a battery separator. Microporous polyolefins begin to shrink at 90° C., limiting the battery fabrication process, the use temperature of the battery, and the power available from the battery.

This situation reveals two key problems with the current state of separators for advanced Li ion batteries. First, microporous membranes made out of polyolefins (polyethylene, polypropylene) provide good structural and barrier properties along with good shutdown capabilities, but they do not provide high temperature stability and low shrinkage and thus are limited on safety performance of higher energy density batteries. Porous structures such as nonwovens that are stable at high temperatures offer low shrinkage and good high temperature stability but they do not offer good shutdown capabilities. Therefore, there is a need for battery separators that combine good barrier properties, shutdown capabilities and high temperature stability in order to maintain the performance and improve the safety of advanced Li ion batteries.

Combinations of these types of materials may offer a balance of these properties. The problem to be solved here is to create a bonding process that will result in good adhesion between the nonwoven layer and the microporous membrane layer while also minimizing any reduction in permeability or increase in resistance.

SUMMARY OF THE INVENTION

The solution to these challenges as described here is two-fold. First, a hybrid separator structure is created that uses a polyimide nonwoven material as one layer and a microporous polyolefin membrane as the other layer and which demonstrates good barrier properties, good shutdown capabilities and high temperature stability all in one separator. Second, an adhesive-based bonding process has been developed by which these two layers are bonded together in a way that ensures good adhesion between the layers without excessively restricting the permeability or increasing the resistance of the final structure beyond acceptable limits.

Another aspect of the present invention is to provide an electrochemical device having the above separator.

In one embodiment the invention is therefore directed to a heat-resistant separator comprising a porous film, a polymeric fibrous web situated in a face to face relationship with the porous film, and an adhesive binder layer located between the porous film and the fibrous layer, said binder layer comprising an adhesive and covering at least a portion of the surface of the porous film that faces the fibrous web, wherein;

the fibrous layer comprises a majority of fibers manufactured of a polyimide said fibers having diameters in the range of 1-3000 nm and a mean fiber diameter in the range of 1-3000 nm, the amount of adhesive present between the porous film and the fibrous web in the final product is within the range of 0.30 grams per square meter of covered surface of porous film to 0.90 grams per square meter of covered surface of porous film, the mean flow pore size of the fibrous layer is 1.5 μm or greater.

The amount of adhesive present between the porous film and the fibrous web in the final product may be in the range of 0.40 grams per square meter of covered surface of porous film to 0.90 grams per square meter of covered surface of porous film.

In a further embodiment the adhesive may be selected from the group consisting of polyvinylidene fluoride, polyvinylidene fluoride-co-hexafluoropropylene, polymethyl methacrylate, polyacrylonitrile, polyvinylpyrrolidone, polyvinyl acetate, polyethylene oxide, cellulose acetate, polyvinyl alcohol, carboxymethylcellulose, sodium carboxymethyl cellulose, a meta-aramid, a para-aramid, styrene butadiene rubber, and mixtures thereof.

The invention is also directed to a process for preparing a heat-resistant separator comprising the steps of
  (i) providing a porous film and a polymeric fibrous web,
  (ii) coating an adhesive solution layer comprising an adhesive and a solvent onto a surface of a porous film, and covering at least a portion of the surface of the porous film,
  (iii) placing the web onto the surface of the porous film that contains the adhesive solution to form a film plus fibrous web laminate with an adhesive solution located in between the faces of the film and the fibrous web,
  (iv) applying sufficient heat to the laminate to remove the solvent, In this embodiment of the process, the fibrous web comprises a majority of fibers manufactured of a polyimide said fibers having diameters in the range of 1-3000 nm and a mean fiber diameter in the range of 1-3000 nm. The porosity of the fibrous web prior to step (iii) is greater than 65%, the mean flow pore size of the fibrous web prior to step (iii) is 1.5 microns or greater, the Frazier air permeability of the fibrous web prior to step (iii) is 2.0 cfm/ft$^2$ or greater, and the coating thickness ratio of the adhesive solution layer prior to step (iv) is greater than or equal to 1.0 and less than or equal to 2.0.

The adhesive solution layer comprises the adhesive at a concentration of 1 percent or greater by weight of adhesive solution, a C3 or higher alcohol that is not isopropanol and a remainder of deionized water such the contact angle of the adhesive solution with respect to the microporous membrane is within the range of 50°-90°.

The adhesive may be selected from the group consisting of polyvinylidene fluoride, polyvinylidene fluoride-co-hexafluoropropylene, polymethyl methacrylate, polyacrylonitrile, polyvinylpyrrolidone, polyvinyl acetate, polyethylene oxide, cellulose acetate, polyvinyl alcohol, carboxymethylcellulose, sodium carboxymethylcellulose, a meta-aramid, a para-aramid, styrene butadiene rubber, and mixtures thereof.

In a still further embodiment of the process of the invention the adhesive is sodium carboxymethylcellulose.

The invention is also directed to an electrochemical device comprising a cathode, an anode and a separator interposed between the cathode and the anode, wherein the separator is any embodiment of the separator claimed herein. The electrochemical device may be a lithium secondary battery.

BRIEF DESCRIPTION OF THE FIGURES

FIG. 1—Resistance vs. N-Propanol Content for Coated Samples of Polyethylene Microporous Membranes

DETAILED DESCRIPTION OF THE INVENTION

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

For the purposes of the present invention, the abbreviations and designations shown in Table 1, consistent with the practice in the polyimide art, will be employed:

TABLE 1

| Abbreviation | Chemical Name | Chemical Structure |
|---|---|---|
| PMDA | Pyromellitic Dianhydride | 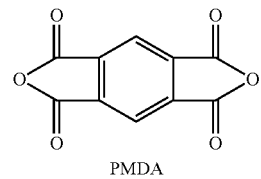 |
| BPDA | Biphenyltetra carboxylic Dianhydride | 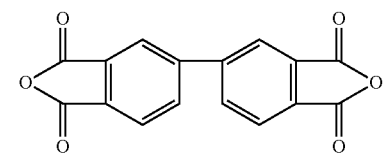 [SMILES: O=C1OC(=O)c2cc(-c3ccc4c(c3)C(=O)OC4=O)ccc21] |
| ODA | Oxydianiline | 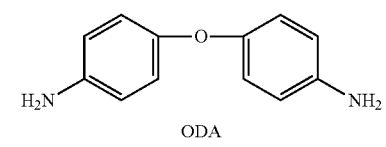 |
| RODA | 1,3-bis(4-aminophenoxy) benzene | 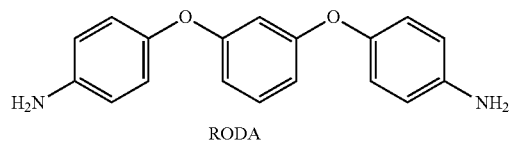 |
| PDA | 1,4 Phenylenediamine | 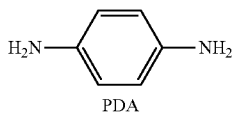 |
| TDI | 2,4-toluene diisocyanate and 2,6 toluene diisocyanate | 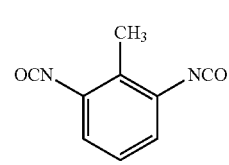 |

TABLE 1-continued

| Abbreviation | Chemical Name | Chemical Structure |
|---|---|---|
| | | [structure: toluene diisocyanate with CH3, two NCO groups] |
| MDI | Methylene diphenyl 4,4'-diisocyanate | [structure: OCN-C6H4-CH2-C6H4-NCO] |
| BTDA | 3,3',4,4'-benzophenone tetracarboxylic dianhydride | [structure: benzophenone tetracarboxylic dianhydride] |

It shall be understood that other dianhydrides and other diamines, not listed in Table 1, are also suitable for use in the present invention, with the proviso that suitable dianhydrides and diamines are consistent with the limitations described infra.

Definitions

The term "nonwoven" means a web including a multitude of randomly distributed fibers. The fibers generally can be bonded to each other or can be unbonded. The fibers can be staple fibers or continuous fibers. The fibers can comprise a single material or a multitude of materials, either as a combination of different fibers or as a combination of similar fibers each comprised of different materials. The term nonwoven as employed herein represents a subset of nonwoven articles wherein the fibers are characterized by cross-sectional diameters of less than 3 micrometers. The nonwovens employed herein define a planar structure that is relatively flat, flexible and porous, and is formed by the lay-down of one or more continuous filaments.

The fibers may preferably have a number average diameter less than 3000 nm, or even 1000 nm, even less than 800 nm, even between about 50 nm and 500 nm, and even between about 100 and 400 nm. In the case of non-round cross-sectional fibers, the term "diameter" as used herein refers to the greatest cross-sectional dimension. The fibers employed in this invention consist essentially of one or more fully aromatic polyimides. For example, the fibers employed in this invention may be prepared from more than 80 wt % of one or more fully aromatic polyimides, more than 90 wt % of one or more fully aromatic polyimides, more than 95 wt % of one or more fully aromatic polyimides, more than 99 wt % of one or more fully aromatic polyimides, more than 99.9 wt % of one or more fully aromatic polyimides, or 100 wt % of one or more fully aromatic polyimides.

As employed herein, the term "fully aromatic polyimide" refers specifically to polyimides that are at least 90% imidized and wherein at least 95% of the linkages between adjacent phenyl rings in the polymer backbone are effected either by a covalent bond or an ether linkage. Up to 25%, preferably up to 20%, most preferably up to 10%, of the linkages may be effected by aliphatic carbon, sulfide, sulfone, phosphide, or phosphone functionalities or a combination thereof. Up to 5% of the aromatic rings making up the polymer backbone may have ring substituents of aliphatic carbon, sulfide, sulfone, phosphide, or phosphone. 90% imidized means that 90% of the amic acid functionality of the polyamic acid precursor has been converted to imide. Preferably the fully aromatic polyimide suitable for use in the present invention is 100% imidized, and preferably contains no aliphatic carbon, sulfide, sulfone, phosphide, or phosphone.

"Calendering" is the process of passing a web through a nip between two rolls. The rolls may be in contact with each other, or there may be a fixed or variable gap between the roll surfaces. An "unpatterned" roll is one which has a smooth surface within the capability of the process used to manufacture them. There are no points or patterns to deliberately produce a pattern on the web as it passed through the nip, unlike a point bonding roll.

"Staple fibers" are discontinues fibers of no longer than 10 cm in length. They can be of similar length like precut synthetic fiber tow or a fiber cluster of dissimilar lengths short fibers clumped together common for natural fibers, such as wool, hemp, or cotton.

By "in contact" means that two layers are touching each other in a face to face relationship over at least a portion of their surfaces. By "direct contact" is meant that the layers contact each other with no intermediate layer. By "in contact via an adhesive layer" means that an adhesive layer may be situated between the two layers that holds them in a position that is fixed relative to each other.

"Shrinkage" is a measure of the dimensional stability. As used herein, shrinkage is measured by the following method. The length of a sample in the machine-direction (MD) and cross-direction (CD) is measured. The sample was placed unrestrained on top of a horizontal support in a conventional laboratory convection oven for 10 minutes at 200° C. The sample is then removed from the oven and allowed to cool down. The MD and CD lengths were then measured again.

Shrinkage in percent is calculated by dividing the surface area (MD length multiplied by the CD length) after heat exposure to the surface area before exposure to heat, subtracting this ratio from one, and multiplying by 100.

"Coating thickness ratio" as discussed in reference to the multilayer article of the present invention is defined as the ratio of the wet film thickness (in μm) of the layer of the adhesive coating between the microporous membrane (layer A) and the nonwoven (layer B) of the invention to the combined thickness of these individual layers (microporous membrane and nonwoven, in μm) prior to the adhesive bonding process. "Wet film thickness" refers to the thickness of the film of adhesive solution that is applied to the microporous membrane before solvent has been removed.

In one embodiment the invention is therefore directed to a heat-resistant separator comprising a porous film, a polymeric fibrous web situated in a face to face relationship with the porous film, and an adhesive binder layer located between the porous film and the fibrous layer, said binder layer comprising an adhesive and covering at least a portion of the surface of the porous film that faces the fibrous web, wherein;
  the fibrous layer comprises a majority of fibers manufactured of a polyimide said fibers having diameters in the range of 1-3000 nm and a mean fiber diameter in the range of 1-3000 nm,
  the amount of adhesive present between the porous film and the fibrous web in the final product is within the range of 0.30 grams per square meter of covered surface of porous film to 0.90 grams per square meter of covered surface of porous film,
  the mean flow pore size of the fibrous layer is 1.5 μm or greater.

The amount of adhesive present between the porous film and the fibrous web in the final product may be in the range of 0.40 grams per square meter of covered surface of porous film to 0.90 grams per square meter of covered surface of porous film.

In a further embodiment the adhesive may be selected from the group consisting of polyvinylidene fluoride, polyvinylidene fluoride-co-hexafluoropropylene, polymethyl methacrylate, polyacrylonitrile, polyvinylpyrrolidone, polyvinyl acetate, polyethylene oxide, cellulose acetate, polyvinyl alcohol, carboxymethyl cellulose, sodium carboxymethyl cellulose, a meta-aramid, a para-aramid, styrene butadiene rubber, and mixtures thereof.

The invention is also directed to a process for preparing a heat-resistant separator comprising the steps of
  (i) providing a porous film and a polymeric fibrous web,
  (ii) coating an adhesive solution layer comprising an adhesive and a solvent onto a surface of a porous film, and covering at least a portion of the surface of the porous film,
  (iii) placing the web onto the surface of the porous film that contains the adhesive solution to form a film plus fibrous web laminate with an adhesive solution located in between the faces of the film and the fibrous web,
  (iv) applying sufficient heat to the laminate to remove the solvent, In this embodiment of the process, the fibrous web comprises a majority of fibers manufactured of a polyimide said fibers having diameters in the range of 1-3000 nm and a mean fiber diameter in the range of 1-3000 nm. The porosity of the fibrous web prior to step (iii) is greater than 65%, the mean flow pore size of the fibrous web prior to step (iii) is 1.5 microns or greater, the Frazier air permeability of the fibrous web prior to step (iii) is 2.0 cfm/ft² or greater, and the coating thickness ratio of the adhesive solution layer prior to step (iv) is greater than or equal to 1.0 and less than or equal to 2.0.

The adhesive solution layer comprises the adhesive at a concentration of 1 percent or greater by weight of adhesive solution, a C3 or higher alcohol that is not isopropanol and a remainder of deionized water such the contact angle of the adhesive solution with respect to the microporous membrane is within the range of 50°-90°.

The adhesive may be selected from the group consisting of polyvinylidene fluoride, polyvinylidene fluoride-co-hexafluoropropylene, polymethyl methacrylate, polyacrylonitrile, polyvinylpyrrolidone, polyvinyl acetate, polyethylene oxide, cellulose acetate, polyvinyl alcohol, carboxymethyl cellulose, sodium carboxymethylcellulose, a meta-aramid, a para-aramid, styrene butadiene rubber, and mixtures thereof.

In a still further embodiment of the process of the invention the adhesive is sodium carboxymethylcellulose.

The invention is also directed to an electrochemical device comprising a cathode, an anode and a separator interposed between the cathode and the anode, wherein the separator is any embodiment of the separator claimed herein. The electrochemical device may be a lithium secondary battery.

A more detailed description of possible embodiments of the possible elements of the structure of the invention follows.

Microporous Membrane (Layer A)

The process of the invention comprises the step of providing a porous membrane layer (layer A) containing thermoplastic resin as main constituent. By "main constituent" is meant more than 50% by weight of the polymer constituents of the membrane. For the thermoplastic resin constituting the main constituent of the porous membrane layer (layer A), those having a peak value of the crystal melting temperature (also referred to as the "crystal melting peak temperature") in a temperature range of 100 to 250 C are preferred, and in particular, those having the peak value in a temperature range of 100 to 175° C., and among them, in a temperature range of 100 to 145° C., are preferred.

This peak value of crystal melting temperature is the peak value of DSC crystal melting temperature collected according to ISO 3146 at a temperature increase speed of 10° C./minute using a differential scanning type calorimeter (DSC), for example model DSC-7 manufactured by Perkin-Elmer.

As long as the above condition of crystal melting temperature peak value is fulfilled, the thermoplastic resin, which is the main constituent of the porous membrane layer (layer A), does not lima the type of resin in particular. However, when the use of the present porous film as a battery separator is intended, one species, or a mixed resin comprising a combination of two species or more, among polyolefin series resins such as low density polyethylene, high density polyethylene, linear low density polyethylene, ethylene vinyl acetate copolymer, polybutene, polypropylene and polymethyl pentene is desirable from the point of view of the chemical resistance, or the like, of the layer A. The microporous membranes used here in this invention were single layer polyethylene membranes, but the invention is not necessarily limited to microporous membranes made of this specific polymer or by a given method of manufacturing. To reiterate, any microporous membranes which are suitable for use in battery chemistry, in terms of chemical stability, mechanical properties, dimensional stability and structural properties are suitable candidates for layer A of this invention.

It is desirable that the porosity of the porous membrane layer (layer A) is 60% or less, preferably 20-60% and more preferably 20-45%.

The average pore diameter of the porous membrane layer (layer A), it is desirable that it is 1 μm or less, preferably 0.5 μm or less and more preferably 0.2 μm or less.

The thickness of the porous membrane layer (layer A), it is desirable that it is 50 μm or less, preferably 30 μm or less and more preferably 15 μm or less.

Polyimide Nonwoven (Layer B)

The article of the invention comprises a polyimide nonwoven (layer B) that is bonded to a microporous film (layer A). The process of the invention comprises the step of providing the polyimide nonwoven that includes a plurality of fibers wherein the fibers consist essentially of a fully aromatic polyimide. Preferably the porosity of the non-woven fabric layer (layer B) is 45% or more. More preferably the porosity of the nonwoven fabric layer is 65% or more.

The invention further provides an electrochemical cell that comprises the article of the invention, namely the polyimide nonwoven that is bonded to the microporous film (layer A) hereof as the separator between a first electrode material and a second electrode material.

Nonwovens of the required fiber diameter can be fabricated, for example without limitation, by a process selected from the group consisting of electroblowing, electrospinning, and melt blowing. The nonwovens employed in the specific embodiments presented here have been prepared by electroblowing. An example of electroblowing of polymer solutions to form a nonwoven is described in Kim et al., U.S. Pat. No. 7,618,579, incorporated herein by reference.

Polyimide nonwovens suitable for use in this invention are prepared by imidization of the polyamic acid nonwoven where the polyamic acid is a condensation polymer prepared by reaction of one or more aromatic dianhydrides and one or more aromatic diamines. Suitable aromatic dianhydrides include but are not limited to pyromellitic dianhydride (PMDA), biphenyltetracarboxylic dianhydride (BPDA) and mixtures thereof. Suitable diamines include but are not limited to oxydianiline (ODA), 1,3-bis(4-aminophenoxy) benzene (RODA) and mixtures thereof. The preferred dianhydride is PMDA. and the preferred diamine is ODA.

In the polyamic acid nonwoven imidization process hereof, the polyamic acid is first prepared in solution; typical solvents are dimethylacetamide (DMAC) or dimethyformamide (DMF). In one method suitable for the practice of the invention, the solution of polyamic acid is formed into a nonwoven by electroblowing, as described in detail below.

Unlike the solvent-soluble polyimides employed in the art in the nonwoven separators of electrochemical cells of the art, the fully aromatic polyimides employed in this invention are highly insoluble. The practitioner of the art could choose to electroblow a solution of the polyimide or a solution of the polyamic acid followed by imidization. The practitioner of the present invention must first form the nonwoven from the polyamic acid, followed by imidization of the nonwoven thus formed.

Imidization of the polyamic acid nonwoven so formed may conveniently be performed by heating the nonwoven to a temperature of at least 350° C. for a length of time—preferably 30 seconds or less—to remove the residual solvent and convert a sufficient amount of the polyamic acid material to the imide state. This may be accomplished by a number of techniques including but not limited to IR heating, through-air drying and use of vacuum ovens. Imidization according to the process hereof results in at least 90%, preferably 100%, imidization. Under most circumstances, analytical methods show that 100% imidization is rarely achieved, even after long imidization times. For practical purposes, complete imidization is achieved when the slope of the percentage imidization vs. time curve is zero.

A description of the nonwoven and preparation of the nonwoven together with test methods can be found in U.S. application Ser. No. 12/899,801, "Multilayer Article Comprising Polyimide Nonwoven", hereby incorporated in its entirety by reference.

In one embodiment, the polyimide nonwoven consists essentially of polyimide fibers formed from pyromellitic dianhydride (PMDA) and oxy-dianiline (ODA), having monomer units represented by the structure,

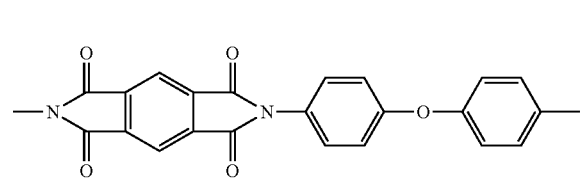

I

Polyimides are typically referred to by the names of the condensation reactants that form the monomer unit. That practice will be followed herein. Thus, the polyimide consisting essentially of monomer units represented by structure I is designated PMDA/ODA.

While the invention hereof is not limited thereby, it is believed that the method of polymerization can affect the polyimide behavior in electrolyte solutions as well. Stoichiometric configurations that allow for excess dianhydride result in polyimides with amine end groups. These amine end groups have active hydrogens which can interact with electrolyte solutions. By adjusting the stoichiometry to have a slight excess of dianhydride or by end-capping the amines with monoanhydrides, such as phthallic anhydride, those active hydrogens are deactivated, thereby reducing interaction with the electrolyte solution.

Multilayer Article

The final step in producing the multilayer article of the present invention comprises an adhesive-based bonding process whereby the polyimide nonwoven (layer B) is adhered to the microporous membrane (layer A). The adhesive that is to be used for this process may be any adhesive that creates a secure bond between the two layers without excessively restricting the permeability or increasing the resistance of the combined structure beyond acceptable limits. Examples of possible polymer binders for an adhesive solution such as this include but are not limited to polymethylmethacrylate (PMMA), polyacrylonitrile (PAN), polyvinylacetate (PVAc), polyethylene oxide (PEO), polyvinyl alcohol (PVA), polyvinylpyrrolidone (PVP), polyvinylidene fluoride (PVdF), polyvinylidenefluoride-co-hexafluoropropylene (PVdF), carboxymethyl cellulose (CMC), sodium carboxymethylcellulose (Na-CMC), cellulose acetate, m-aramids, p-aramids, SBR and their mixtures. In the process for creating the present invention, a layer of the chosen adhesive is first applied to the surface of the microporous membrane (layer A). If desired, a carrier or backing sheet may be used underneath the microporous membrane during the application of the adhesive in order to provide additional support to the membrane. Once the adhesive is thus applied, the polyimide nonwoven (layer B) is laid on top of the layer of adhesive which then creates a bond between the two layers. This bond is solidified if needed by removing the solvent from the adhesive layer through a suitable drying process. If a carrier sheet was used, some further processing will be required to remove the article of the invention from this carrier sheet. Any method which does not alter the multilayer article of the invention in a way that prevents it from functioning in the battery may be used to accomplish this separation.

EXAMPLES

Test Methods

Thickness

Thickness of the polyimide nonwoven material and the polyolefin microporous membrane is measured by test method D of ASTM D5947-11, hereby incorporated in its entirety by reference. The test apparatus (type D) used in the present examples was a Hanatek FT3 precision thickness gauge (Hanatek Instruments, East Sussex, UK) with a foot diameter of 16 mm and a pressure of 50 kPa. The measurements were done using one layer of nonwoven sheet, one layer of microporous membrane or one piece of the multilayer article of the present invention with 10 individual, equally spaced readings being taken in the cross direction. The thickness of the sample was reported as the average of the 10 individual readings.

Ionic Resistance

Ionic Resistance is a measure of a separator's resistance to the flow of ions, and is measured using an AC impedance technique comparable to that described in SAE J2983. Samples were cut into four small pieces (3.175 cm diameter) and soaked in 1 M LiPF6 in 30:70 Ethylene Carbonate/Ethyl Methyl Carbonate (EC/EMC) electrolyte. The separator resistance was measured using Solartron 1287 Electrochemical Interface along with Solartron 1252 Frequency Response Analyzer. and Scribner Associates Zplot (version 3.1c) software. The test cell had a 5.067 square cm electrode area that contacted the wetted separator. Measurements were done at AC amplitude of 5 mV and the frequency range of 10 Hz to 100,000 Hz. The high frequency intercept in the Nyquist plot generated by the analyzer is the resistance of the material being tested (in ohms). The separator resistance (ohm) was multiplied by the electrode area (5.067 square cm) to determine the ionic resistance in ohm-cm2. This procedure was conducted for one layer of the separator and then the second piece was stacked on top of the first layer and the procedure was repeated. The third and fourth pieces were then added to this stack with the resistance measuring procedure being repeated after each addition. The average of the difference in resistance between the first and second tests, the second and third tests and the third and fourth tests was then reported as the overall resistance of the sample.

Basis Weight

Basis weight was determined according to ASTM D3776 and reported in g/m2. For this test, four pieces of material were cut from the sheet using one of two dies. The standard die for this test was 100 mm×100 mm. In cases where the width of the sample was too small to accommodate a die of this size, a 60 mm×60 mm die was used. This met the requirement in ASTM D3776 for the total sample area to be 130 cm$^2$. In addition, the samples were equally spaced across the sheet such that no sample was closer to the edge of the sheet than 10% of the width of the sample. The mass of each piece was then determined using a Mettler Toledo lab scale. The basis weight of each piece was calculated by dividing the mass of each piece by the area of the die. The basis weight of the sample was reported as the average of these four readings.

Porosity

Porosity was calculated by dividing the basis weight of the sample in g/m$^2$ by the polymer density in g/cm$^3$ and by the sample thickness in micrometers and multiplying by 100 and subsequently subtracting from 100%, i.e., percent porosity=100−basis weight/(density×thickness)×100.

Frazier Air Permeability

The air permeability of the polyimide nonwoven (layer B) was tested according to ASTM Designation D737-04, "Standard Test Method for Air Permeability of Textile Fabrics" incorporated herein by reference in its entirety. Individual samples were placed in the holder of a TEXTEST FX 3300 Air Permeability tester (Textest Instruments, Switzerland) and air was drawn through an area of the sample measuring 38.3 cm$^2$ such that the pressure drop across the sample was at least 125 Pa (0.125 kPa). The flow rate of air in ft$^3$/min (cfm) that was required to produce this drop in pressure was recorded as the Frazier air permeability with the units of cfm/ft$^2$. It was necessary to use this test method for the air permeability of the polyimide nonwoven (layer B) because this layer is too porous to be tested by the same method that is used on the microporous membrane (layer A) or on the multilayer article of the present invention. However, if the polyimide nonwoven (layer B) had been consolidate too heavily (defined as having a Frazier Air Permeability less than or equal to 1.0 cfm/ft$^2$), the Gurley Air Permeability method was used instead (see below).

Gurley Air Permeability

For the multilayer article of the present invention and the microporous membrane (layer A) as well as any samples of the polyimide nonwoven material (layer B) that had been sufficiently consolidated (defined as having a Frazier Air Permeability less than or equal to 1.0 cfm/ft$^2$), the air permeability was tested according to TAPPI T 460-2, "Air Resistance of Paper (Gurley Method)" incorporated herein by reference in its entirety. Individual samples were placed in the holder of an Automatic Densometer Model 4340 (Gurley Precision Instruments, Troy, N.Y.) and air was forced through an area of 0.1 inch2 or 0.645 cm2 of the sample, recalculated by software to 1 inch2 or 6.45 cm2. The time in seconds required for 100 (cm3) of air to pass through the sample was recorded as the Gurley air permeability with the units of (s/100 cm3 or s/100 cc).

Tensile Strength

"Tensile strength" as used herein refers to the test according to ASTM D5035-06, "Standard Test Method for Breaking Force and Elongation of Textile Fabrics (Strip Method)." Tensile strength was determined for samples cut into 50×250 mm strips and pulled until breaking in a tensile testing machine at rates between 50 mm/min and 70 mm/min with a gauge length of 200 mm. The rate was adjusted to target an average time to break of 20 seconds.

Degree of Imidization

The degree of imidization of the polyimide nonwoven material (layer B) of the present invention was tested according to the specified site lab procedure. In this procedure, three pieces are cut from the sample of polyimide nonwoven material using a 60 mm×60 mm die. Each piece is then analyzed via FT-IR spectrometry using a Perkin Elmer Spectrum 100T Spectrometer and its associated software. The spectrometer is configured to conduct a series of scans of the sample using laser light in a range of wavelengths from 650 $cm^{-1}$ to 4,000 $cm^{-1}$. A macro in the spectrometer software is then used to examine the spectrum generated by this scan and calculate the ratio of the height of the peak at 1,375 cm−1 to the height of the peak at 1,500 $cm^{-1}$. This ratio is defined as the degree of imidization of the sample. This procedure is repeated for each of the three pieces which was cut from the polyimide nonwoven material and the degree of imidization of the sample is reported as the average of the results of these three tests. The sample is considered to have been fully imidized if the degree of imidization as measured by this procedure is greater than or equal to 0.53.

Pore Size

The average pore size (also referred to as the mean flow pore size) and the maximum pore size (also referred to as the bubble point) of the multilayer article of this invention and of the individual layers comprising this article were determined according to ASTM F316 through the use of a CFP 2100 AE Capillary Flow Porometer. In this test, three circular pieces of material are cut from the sample with each circle having a diameter of one inch. Each piece is then placed in the porometer, covered with the prescribed wetting fluid and air is passed through the material at the settings prescribed by the ASTM standard referenced previously. The graph generated by the porometer software during this process is then used to calculate the mean flow pore size and bubble point of the sample. This test is then repeated for the other two pieces which were cut from the sample and the mean flow pore size and bubble point of the sample are reported as the average of the results from these three tests.

Contact Angle

The contact angle of the adhesive solution of the present invention with respect to the microporous membrane (layer A) was measured using a Kruss DSA100 Drop Shape Analyzer. In this test, a single drop of test solution (in this case the adhesive solution of the present invention) is placed on the desired substrate (in this case the microporous membrane (layer A)). A PET film was placed beneath the microporous membrane during this test to preserve the cleanliness of the instrument should the test solution soak through the microporous membrane. The drop shape analyzer was then used to capture an image of the shape of the drop thus applied to the microporous membrane and the analyzer software was used to calculate the angle between the sides of the drop and the surface of the microporous membrane right where the drop contacted this surface. Three to four such measurements were taken with each sample of the adhesive solution depending on the resolution of the resulting images. The final contact angle of the adhesive solution was reported as the midpoint of the range of contact angles that were collected through these tests.

Electrochemical Cell Testing—Rate Capability

The rate capability test for electrochemical cells was performed at ambient temperature by means of a Maccor Series 4000 battery tester (Maccor, Inc. Tulsa, Okla. 74107). The test was performed in an enclosed dry glove box with an argon atmosphere. The cell was first subjected to three additional adjusted formation cycles with charging to 4.2 V at a current of 1.0 mA and discharging to 2.75 V at a current of 2.5 mA. A rest period of 15 minutes was provided between each half cycle. After the final rest period, the cell was charged up to 4.2 V one more time at a current of 1.0 mA and then the varying rate part of the test was started. During this part of the test, the cell was discharged to 2.75 V at a series of different currents ("rates") in the following sequence: 37.5 mA (15 C), 30 mA (12 C), 22.5 mA (9 C), 15 mA (6 C), 7.5 mA (3 C), 2.5 mA (1 C), 1.25 mA (0.5 C), 0.625 mA (0.25 C) and 0.417 mA (0.17 C). A rest period of two hours was provided between the discharging of the cell at each rate. The capacity of the cell was measured in mAh after the discharging at each rate. Capacity loss statistics could then be calculated as desired from these data. The exact statistics calculated, for example first irreversible loss and irreversible loss after a certain rate, depend on the exact cell being tested. After the final discharging step at a current of 0.417 mA, the cell was again subjected to three of the adjusted formation cycles that were performed on it at the beginning of the test.

Electrochemical Cell Testing—Long Term Cycling

The long term cycling test for electrochemical cells was also performed at ambient temperature by means of a Maccor Series 4000 battery tester (Maccor, Inc. Tulsa, Okla. 74107). The test was performed in an enclosed dry glove box with an argon atmosphere. Following the rate capability test described above, each cell was subjected to 75 cycles of charging to 4.2 V at 1.0 mA and discharging to 2.75 V at 2.5 mA with a rest period of 10 minutes between each half cycle. The value of 4.2 V was the desired target for each charging step, but a time limit of 20 hours was also placed on each charging step in the event that the voltage of the cell did not reach the target value. The test proceeded to the next discharging step once the voltage of the cell reached the target value of 4.2 V or once this time limit had expired. The capacities for charging and discharging (in mAh) were recorded for each cycle.

Sample Manufacture

Preparation of Polyamic Acid Solution

This solution was prepared for DuPont by Heraeus Precious Metals at their facility in Vandalia, Ohio. 4,4 oxydianiline (ODA) was added to dimethylformamide (DMF) and then the required amount of pyromellitic dianhydride (PMDA) was added to this mixture. The reactants were then stirred at room temperature in order to form a polyamic acid (PAA) solution. The amounts of the three raw ingredients (PMDA, ODA and DMF) and the steps of the mixing procedure were selected to create a final solution with a solids concentration in the range of 23.0-24.0% and a viscosity in the range of 70-80 Poise when measured at 25° C.

Preparation of Polyimide Nanowebs

The polyamic acid solution which was thus prepared was then electroblown into a fibrous web according to the process described in U.S. Published Patent Application No. 2005/0067732, hereby incorporated herein in its entirety by reference. The polyamic acid nonwoven material thus produced was then imidized and calendered to reach the final structure prior to the adhesive bonding process. The imidization was accomplished by exposing the polyamic acid nonwoven to a temperature of 350° C. in a through-air dryer with a vacuum drum where the residence time was set by the line speed required to produce the desired basis weight at the given polymer throughput. The calendering step was completed by passing the polyimide nonwoven material through a nip comprising a stainless steel top\heated roll and a composite material bottom roll at one of three possible sets of calendering conditions—low, medium and high. These settings are summarized in the table 1 below.

TABLE 1

| Level of Calendering | Calender Temperature (° C.) | Calender Nip Pressure (PLI) |
|---|---|---|
| Low | 60 | 300 |
| Medium | 100 | 180-300 |
| High | 95-200 | 1000-2000 |

Preparation of Microporous Membrane (Layer A)

The microporous membrane (layer A) which was used in the examples disclosed here was a single layer polyethylene microporous film obtained from Linyi Gelon New Battery Materials Co. LTD (Shandong, China.) It was prepared through the wet process for producing microporous membranes and had the properties which are shown in the following table. These properties were determined using the test methods described above.

TABLE 2

| Property | Value |
|---|---|
| Basis Weight (gsm) | 9.28 |
| Porosity (%) | 38.5 |
| Gurley AP (s/100 cc) | 264.7 |
| Resistance ($\Omega$-cm$^2$) | 1.49 |
| Thickness ($\mu$m) | 16.6 |

Preparation of Multilayer Article

The polyethylene microporous membrane (layer A) and polyimide nonwoven web (layer B) which had been prepared as described above were then combined using an adhesive based coating process in order to create the multilayer article of the invention. The adhesive for this process comprised a mixture of sodium carboxymethylcellulose (hereafter referred to as Na-CMC), n-propanol and deionized water.

This solution was prepared through a simple mixing procedure. First, the desired amount of deionized water was weighed into the mixing vessel and the water was then agitated. Second, the desired amount of Na-CMC was weighed out and was then slowly added to the deionized water while the agitator was still in motion. Caution was used to avoid adding the Na-CMC directly into the center of the vortex that was created by the agitator. The vessel was then covered and the mixture of deionized water and Na-CMC was vigorously agitated until all of the Na-CMC was dissolved. Once this level of dissolution was achieved, the desired amount of n-propanol was weighed out and added to the mixing vessel—again while the agitator was still in motion and while avoiding the center of the vortex which was being caused by the agitator. After stirring the mixture thoroughly to mix in the n-propanol, the finished solution was allowed to sit undisturbed for a period of time to allow any air bubbles to dissipate before the solution was bottled.

The coating technique which was used to apply this adhesive solution to create the multilayer article of the present invention was slot die transfer coating using a DynaCoat lab scale slot die coating machine manufactured by Frontier Industrial Technology, Inc.

In the coating process, the first step comprised applying a layer of the adhesive bonding solution to a carrier sheet (PET film in the present case) using the slot die coating machine described above and then laying the polyethylene microporous film (layer A) onto the wet layer of adhesive. After drying, the polyethylene microporous membrane (layer A) which had been anchored to the PET film carrier sheet was run through the slot die coating machine again for the second pass of this process. In this pass, a second layer of the adhesive bonding solution was applied on top of the polyethylene microporous membrane (layer A) and then the polyimide nonwoven material (layer B) was laid on top of the wet adhesive, causing the two layers to be bonded to one another. After drying, the materials thus bonded together were then separated from the PET film carrier sheet, resulting in the multilayer article of the present invention. The characteristics of the adhesive solution and coating steps used for this variation of the adhesive bonding process are shown in the table below. The concentrations shown here were set during the blending process for the solution by measuring out the required portions of each ingredient using a laboratory scale.

TABLE 3

| Coating Variables for Two Pass Process | First Pass | Second Pass |
|---|---|---|
| Na-CMC (wt %) | 0.5% | 1.0% |
| n-propanol (wt %) | 12.5% | 12.5% |
| Deionized water (wt %) | 87.0% | 86.5% |
| Wet Film Thickness of Adhesive Coating ($\mu$m) | 9.40 | 46.6 |

Preparation of Electrochemical Device

The multilayer article of the present invention was also used in the construction of an electrochemical device designed to represent a lithium secondary battery in order to demonstrate the ability of this article to be used as a functional separator in such devices. Coin cells (type CR2032) were assembled for this purpose using commercially available parts. These coin cells provide an electrochemical device having a housing comprised of a stainless steel case and a stainless steel cap for said case with the stainless steel cap also containing a polypropylene gasket. To prepare for the assembly of the coin cells, the desired anode and cathode materials along with the multilayer article of the present invention were dried in a vacuum oven for 12 hours at 90° C. The interior of the coin cell then comprised an electrolyte (described in the next paragraph) and a stack of materials at least partially immersed in the electrolyte. This stack of materials further comprised a first stainless steel spacer disk, an anode current collector (copper foil folded around micro glass paper), an anode material (carbon anode on copper foil) in electrically conductive contact with the anode current collector, a cathode material ($LiCoO_2$ cathode on aluminum foil) in ionically conductive contact with the anode material, a porous separator (the multilayer article of the present invention) disposed between and contacting the anode material and the cathode material, a cathode current collector (aluminum foil folded around micro glass paper) in electrically conductive contact with the cathode material, a second stainless steel spacer disk and finally a stainless steel wave washer. This stack of materials along with the electrolyte was assembled within the stainless steel case referred to above and then the case was sealed with the polypropylene gasket and stainless steel cap. All parts for this electrochemical device except for the electrolyte and the porous separator were obtained from Hoshen Corporation.

In one embodiment of this electrochemical device, the device is a lithium ion battery in which the liquid electrolyte comprises an organic solvent and a lithium salt soluble therein. In a further embodiment, the lithium salt is $LiPF_6$, $LiBF_4$ or $LiClO_4$. In a still further embodiment, the organic solvent comprises one or more alkyl carbonates. In a still further embodiment, the one or more alkyl carbonates comprises a mixture of ethylene carbonate and dimethyl carbonate. The optimum range of salt and solvent concentrations may vary according to specific materials being employed and the anticipated conditions of use; for example, according to the intended operating temperature. In the embodiment of the present electrochemical device described above, the solvent for the electrolyte is 70 parts by volume ethylene carbonate and 30 parts by volume dimethyl carbonate and the salt for the electrolyte is $LiPF_6$. This electrolyte solution was obtained from Ferro.

Cell assembly was carried out in a dry "glove box" with an argon atmosphere since the electrolyte reacts with water. Moisture can lead to hydrolysis of $LiPF_6$ to HF, which can degrade the electrodes and adversely affect the cell performance.

The final step in the preparation of this electrochemical cell was the formation step, which was necessary in order to activate the working materials in the cell. For most lithium ion chemistries, this involves creating the SEI (solid electrolyte interface) layer on the negative (carbon) electrode. This is a passivating layer which is essential to protect the lithiated carbon from further reaction with the electrolyte. This step was performed using a Maccor Series 4000 Battery Tester (Maccor, Inc., Tulsa, Okla. 74107). Each cell assembled as described above was subjected to three complete formation cycles of charging to 4.2 V and then discharging to 2.75 V with each step being conducted at a current of 0.25 mA. The value of 4.2 V was the desired target for each charging step, but a time limit of 25 hours was also placed on each charging step in the event that the voltage of the cell did not reach the target value. The formation cycle proceeded to the next discharging step once the voltage of the cell reached the target value of 4.2 V or once this time limit had expired. A rest period of 10 minutes was provided between each half cycle. After the completion of the final rest period, the cell was considered to be ready for electrochemical performance testing.

Results

The following four tables give a description of the successful examples of the multilayer article of the present invention as well as the relevant comparative examples. The first table presents the properties of the polyimide nonwoven materials that were used as layer B in these examples. The properties shown in this table are those of the polyimide nonwoven layer prior to the adhesive bonding process. The second table presents key details on the adhesive coating process that was used to bond the polyimide nonwoven (layer B) to the polyethylene microporous membrane (layer A). It also shows the critical final properties of the multilayer structure which was produced. These properties demonstrate the success or failure of these examples. The third and fourth tables present the results of the rate capability tests and long term cycling tests that were performed on electrochemical cells made with the multilayer article of the present invention included as the separator for the cell. For comparison, these results also show the performance of an electrochemical cell made with a standard polyolefin microporous membrane as the separator. Together, the third and fourth tables show that the multilayer article of the present invention is sufficient as a separator in an electrochemical cell. Some definitions which apply to these tables are:

"PI"=Polyimide (as in polyimide nonwoven web (layer B)

"Fine" fiber=Nonwoven with fibers having a diameter in the range of 400-500 nm

"Coarse" fiber=Nonwoven with fibers having a diameter in the range of 600-700 nm AP=Air permeability (either Frazier or Gurley as defined in "Test Methods" above)

"Low" adhesion=layers could be easily separated in large or whole pieces without physical damage to either layer. No PI fiber residue left behind on microporous membrane.

"Medium" adhesion=layers could be separated, but not without some physical damage to one or both layers. Separating layers as whole pieces was difficult. Significant amounts of PI fiber residue left behind on microporous membrane.

"High" adhesion=layers could not be separated—in whole pieces or otherwise—without significant physical damage to one or both layers (especially the PI layer). Large portions of the PI layer left behind during attempts to separate layers.

TABLE 4

Properties of the Polyimide Nonwoven (Layer B) Used for Examples of the Current Invention

| Sample ID | PI Fiber Size | PI Calendering | Basis Weight gsm | Thickness μm | Frazier AP cfm/ft² | Gurley AP s/100 cc | Pore Size Average μm | Pore Size Max μm | Porosity % | Resistance Ω-cm² |
|---|---|---|---|---|---|---|---|---|---|---|
| Example 1 | Coarse | Low | 3.75 | 13.4 | 52.6 | Too porous | 5.3 | 8.1 | 80.4% | 0.33 |
| Example 2 | Fine | Low | 4.03 | 16.8 | 10.6 | | 2.1 | 3.1 | 83.2% | 0.35 |
| Example 3 | Fine | Medium | 8.89 | 18.1 | 2.5 | | 1.6 | 2.3 | 65.7% | 0.59 |
| Comparative A | Coarse | High | 5.35 | 15.4 | Too | 2.0 | 1.2 | 2.5 | 75.7% | 0.59 |
| Comparative B | Fine | High | 12.21 | 16.7 | dense | 12.2 | 0.5 | 0.9 | 48.9% | 1.33 |
| Comparative C | Fine | High | 16.11 | 22.0 | | 24.6 | 0.4 | 0.8 | 48.7% | 1.15 |
| Comparative D | Fine | Low | 4.03 | 16.8 | 10.6 | Too porous | 2.1 | 3.1 | 83.2% | 0.35 |
| Comparative E | Coarse | Medium | 9.30 | 22.7 | 6.5 | | 3.1 | 4.4 | 71.3% | 0.51 |
| Comparative F | Coarse | Low | 3.75 | 13.4 | 52.6 | | 5.3 | 8.1 | 80.4% | 0.33 |

TABLE 5

Key Coating Settings and Final Properties for Multilayer Article of the Invention.

| SAMPLE | Coating Process | Coating Wet Film Thickness (μm) | Dry Loading of Na-CMC (g/m²) | Final Bilayer Resistance (Ω-cm²) | Total Resistance Increase Due to Coating | Final Bilayer Gurley (s/100 cc) | Gurley Increase Due to Coating | Coating Thickness Ratio | PE-to-PI Adhesion Rating |
|---|---|---|---|---|---|---|---|---|---|
| 1 | Two Pass | 46.6 | 0.47 | 2.69 | 0.87 | 306.7 | 42.0 | 1.6 | High |
| 2 | Two Pass | 46.6 | 0.47 | 2.28 | 0.43 | 327.1 | 62.4 | 1.4 | Medium |
| 3 | Two Pass | 46.6 | 0.47 | 2.52 | 0.44 | 311.0 | 46.3 | 1.3 | Medium |
| A | Two Pass | 45.7 | 0.46 | 4.89 | 2.81 | 430.3 | 165.6 | 1.4 | Medium |
| B | Two Pass | 45.7 | 0.46 | 4.57 | 1.75 | 418.0 | 153.3 | 1.4 | Low |
| C | Two Pass | 45.7 | 0.46 | 5.09 | 2.45 | 378.9 | 114.2 | 1.2 | Low |
| D | Two Pass | 93.1 | 0.93 | 3.12 | 1.28 | 466.1 | 201.4 | 2.8 | High |
| E | Two Pass | 93.1 | 0.93 | 3.12 | 1.11 | 379.3 | 114.6 | 2.4 | High |
| F | Two Pass | 23.1 | 0.23 | 2.83 | 1.01 | 373.9 | 109.2 | 0.8 | Low |

TABLE 6

Rate Capability Data for Electrochemical Cells Using the Multilayer Article of the Present Invention as a Separator

| Cell ID | Initial Capacity (mAh) | Percent of Capacity at 15 C Rate | Percent of Capacity at 6 C Rate | Percent of Capacity at 1 C Rate | Percent of Capacity at 0.25 C Rate |
|---|---|---|---|---|---|
| Polyolefin Microporous Membrane (control) | 2.87 | 21% | 90% | 99% | 100% |
| Example 1 - Cell 1 | 2.87 | 22% | 92% | 99% | 100% |
| Example 1 - Cell 2 | 2.86 | 27% | 93% | 99% | 100% |
| Example 1 - Cell 3 | 2.89 | 25% | 93% | 99% | 100% |
| Average of Cells for Example 1 | 2.87 | 25% | 92% | 99% | 100% |

TABLE 7

Long Term Cycling Data for Electrochemical Cells Using the Multilayer Article of the Present Invention as a Separator

| Cell ID | Initial Capacity (mAh) | Irreversible Capacity Loss after 1st Cycle (%) | Capacity Loss after 25 Cycles (%) | Capacity Loss After 50 Cycles (%) | Capacity Loss After 75 Cycles (%) |
|---|---|---|---|---|---|
| Polyolefin Microporous Membrane (control) | 2.96 | 11% | 5.6% | 7.3% | 8.4% |
| Example 1 - Cell 1 | 2.99 | 11% | 5.4% | 7.0% | 8.2% |
| Example 1 - Cell 2 | 2.96 | 10% | 5.9% | 7.2% | 8.2% |
| Example 1 - Cell 3 | 2.98 | 12% | 5.4% | 7.0% | 8.0% |
| Example 1 - Cell 4 | 2.89 | 11% | 5.9% | 7.5% | 8.8% |
| Average of Cells for Example 1 | 2.96 | 11% | 5.6% | 7.2% | 8.3% |

Discussion of Results

A successful multilayer separator must demonstrate adequate adhesion between the layers comprising the separator and must also show adequate permeability so that the resistance of the final structure is acceptable. In terms of adhesion, the layers should at least be adhered tightly enough that they cannot be separated by ordinary sheet handling techniques—this was defined as medium adhesion for the purpose of the present invention. Furthermore, a successful example of the multilayer article of the present invention must also be able to function adequately as a separator when used for that purpose in an electrochemical cell.

In the case of examples 1-3, the properties of the base PI structure and the amount of adhesive which was applied were in a range that resulted in improvements in the properties of the separator compared to comparative examples.

The data above show that the PI nonwoven layer which was used to create Examples 1 was of a significantly higher permeability and average pore size than was observed with Examples 2 and 3. Even though the properties of these examples spanned such a range, the data above also show that the final resistance of the multilayer structure was no more than 2.69 $\Omega\text{-}cm^2$ and that the increase in resistance due to the adhesive was no more than 0.94 $\Omega\text{-}cm^2$ in all three cases. Additionally, these data show that while the level of adhesion between the two layers was medium or better for all three successful examples, the two examples which showed the lowest permeability and pore size—Examples 2 and 3—also showed the least adhesion of the four successful examples. Consequently, any further reductions in permeability and pore structure would have resulted in an inadequate level of adhesion between the layers. This indicates that the combination of adhesive and PI nonwoven properties found in this range of examples is sufficient to meet desired performance targets.

Comparative examples A-F in the previous two tables demonstrate key variations in the property and adhesive limits which have just been discussed which further support the validity of these limits. In the case of comparative examples A-C, the same relative amount of adhesive solution as defined by the coating thickness ratio was applied between the polyethylene microporous membrane (layer A) and the polyimide nonwoven layer (layer B) as was used with the successful examples. However, the resistance of the final multilayer structure and the increase in resistance due to the application of the adhesive were both well above the acceptable limits. The reason for this can be seen by examining the properties of the polyimide structure prior to the adhesive bonding step. For comparative examples A-C, the level of consolidation of this layer was greatly increased versus the successful examples. This is demonstrated by the fact that the pore size of these samples was below 1.5 μm—and below 1.0 μm in the case of comparative examples B and C. In addition, the permeability of these three samples had to be tested via the Gurley method because the pores in the PI structure were too small to allow the Frazier method to be used. As a result, the average resistance of the PI structure prior to adhesive bonding was noticeably higher for comparative examples A-C (1.02 $\Omega\text{-}cm^2$) than it was for the successful examples (0.42 $\Omega\text{-}cm^2$). Since the same amount of adhesive was applied to these comparative examples as was given to the successful examples and since the resistance of the polyethylene microporous membrane for these comparative examples was also the same (1.49 $\Omega\text{-}cm^2$), the higher resistance of the PI structure prior to bonding would then result in an unacceptably high resistance for the final multilayer structure. This is exactly what is shown in comparative examples A-C, where the resistance of the multilayer structure was no less than 4.57 $\Omega\text{-}cm^2$ and the increase in resistance due to the application of the adhesive was no less than 1.75 $\Omega\text{-}cm^2$. Furthermore, the adhesion between the layers of the invention was rated as unacceptable in comparative examples B and C, which were also the two comparative examples with the lowest permeability and pore size.

These data clearly show the unexpected result that if the structure of the PI nonwoven layer prior to the adhesive bonding step is more consolidated than is shown by Examples 1-3, the multilayer article which results will not be a successful sample.

On the other hand, comparative examples D-F demonstrate the adequacy of the amount of adhesive which was used in the successful examples. The data above show that the properties of the polyimide nonwoven layer prior to bonding which was used in comparative examples D-F were actually within the same range which was demonstrated to be adequate by Examples 1-3. However, the relative amount of adhesive which was applied to comparative examples D and E (average coating thickness ratio of 2.6) was roughly twice the amount which was applied to the successful examples (average coating thickness ratio of 1.4). With roughly double the amount of adhesive present between the layers, the increase in resistance due to the presence of the adhesive was also roughly doubled—from an average of 0.58 $\Omega\text{-}cm^2$ for Examples 1-3 to an average of 1.20 $\Omega\text{-}cm^2$ for comparative examples D and E. This additional adhesive caused the final resistance of the multilayer article (3.12 $\Omega\text{-}cm^2$) and the increase in resistance due to the adhesive to be well beyond the acceptable limits.

The adhesion between layer A and layer B for comparative examples D and E was significantly improved, but this cannot be tolerated given that the critical property limit for resistance was not also satisfied. In the case of comparative example F, the amount of adhesive solution which was applied to the microporous membrane was roughly half of the amount that was used in Examples 1-3. It can be shown that this amount was equivalent to an adhesive solution with a Na-CMC content of 0.5 wt %. Although the resistance of the multilayer article of comparative example F was within the desired limits, the adhesion between the microporous membrane and polyimide nonwoven was rated as too low. This indicates that there was not enough solid adhesive present in comparative example F to adequately secure the layers of the current invention to one another.

The dry loading of the Na-CMC adhesive is the amount of adhesive (in grams) present between layer A and layer B of the multilayer article of the present invention. The data in Table 5 show that for successful examples of this invention, the dry loading in the covered areas of the porous film was in the range of approximately 0.30 grams per square meter (g/m2)—0.90 g/m2. When the amount of adhesive was below this range (see comparative example F), the adhesion between the layers was not acceptable. When the amount of adhesive was above this range (see comparative examples D and E), the adhesion between the layers was acceptable but the resistance of the final structure was not acceptable. In the case of comparative examples A-C, the dry loading of the Na-CMC was within this range, but as was noted previously, this did not matter because the starting polyimide layer was too consolidated prior to bonding. This caused the resistance of those three comparative examples to be unacceptably high.

Given these findings, it can be concluded that successful examples of the multilayer article of the present invention must have both the properties of the polyimide nonwoven layer prior to bonding and an amount of adhesive solution that are within the ranges specified by Examples 1-3 in the tables above. These ranges are summarized in the Claims section below.

The data in Tables 6 and 7 above were collected to demonstrate the performance of the multilayer article of the present invention as the separator within an electrochemical cell. A control cell was first assembled using a single layer polyolefin microporous membrane (Celgard® 2300) as the separator in order to have an example using a separator of the current art of the invention. This cell was then used as the performance standard by which the cells made using the multilayer article of the present invention as the separator would be judged for adequacy. The data in the second column of Tables 6 and 7 shows that these cells exhibited the same initial capacity as the control cell during both tests (2.87 mAh for the rate capability test, 2.96 mAh for the long term cycling test). Furthermore, the remaining data in Table 6 shows that these cells also showed a similar amount of capacity remaining at high charging rates (92% at 6 C and 25% at 15 C) as compared to the control cell (90% at 6 C and 21% at 15 C). The data in Table 6 also show that the cells made using the multilayer separator of the present invention exhibited the same amount of capacity remaining at lower charge rates as was observed with the control cell (100% at 0.25 C and 99% at 1 C). Additionally, the remaining data in Table 7 show that these cells displayed almost the same reduction in capacity (8.3% after 75 cycles) during the long term cycling test as was displayed by the control cell (8.4% after 75 cycles). These data show that successful examples of the multilayer article of the present invention are indeed sufficient for use as separators within fully functioning electrochemical cells.

Effect of Alcohol

All samples of the multilayer article of the present invention used n-propanol as the alcohol in the adhesive solution. The concentration of n-propanol in the solution was 12.5%. However, several other types and concentrations of alcohol were examined for wetting behavior. Observations from these attempts provide guidance on what type of alcohol must be used for this solution as well as the concentration that is needed.

Testing using isopropanol and methanol showed that these solutions would not wet on the PE film. They dewetted immediately after having been spread out on the microporous membrane with a #20 drawdown rod, showing that alcohols lower than C3 would not produce a solution with sufficient wetting behavior and also showing that a successful C3 alcohol could not be isopropanol.

A solution of 5% n-propanol, 2% polyvinyl pyrrolidone and 93% deionized water was applied to the microporous membrane with a #3 drawdown rod. Another test was run where a solution of 10% n-propanol, 2% Na-CMC and 88% deionized water was applied to the microporous membrane also using a #3 drawdown rod. In both cases, the solution failed to wet properly on the microporous membrane and started to bead up, indicating that solutions without a sufficiently high alcohol content are unlikely to wet properly. A solution of 15% n-propanol, 1% Na-CMC and 84% deionized water was tested with a Hegman gauge after having been mixed according to the usual mixing procedure for this solution. The Hegman gauge test showed a significant increase in the number of undissolved particles of Na-CMC in the solution, which would have prevented a smooth wet film from forming during the adhesive bonding process. As a result it was concluded that the Na-CMC adhesive might not be sufficiently soluble in adhesive solutions with an excessively high alcohol content.

Given these findings, an additional study was conducted on the impact of the overall composition of the solution on the wettability of the solution to clarify the acceptable range of compositions, especially with respect to the concentration of the alcohol. For this study, several blends of the Na-CMC adhesive solution were prepared spanning a range of compositions from 0.5 wt %-2.0 wt % for Na-CMC and 0 wt %-25 wt % for n-propanol. The contact angle of select blends within these ranges with respect to the polyethylene microporous membrane was then measured using the method described above (see Table 8 below). A PET backing sheet was placed beneath the microporous film for support. In addition, several blends of solution within these ranges were coated onto strips of the polyethylene microporous film (layer A) of the present invention using drawdown rods. The resistance of these samples was then measured and plotted versus the alcohol content. The goal of this study was to determine at what point the increasing alcohol content would decrease the contact angle (and thus increase the wettability) of the solution enough to cause the solution to penetrate into the bulk structure of the polyethylene microporous membrane. At this point, the permeability of the microporous membrane would be significantly decreased, thus resulting in a rapid increase in the resistance of the sample. This would then prevent the resulting multilayer article of the present invention from meeting the acceptance criteria described above, which would also mean that the levels of alcohol content so defined would serve as adequate limits to describe a successful adhesive solution. The results of this study are shown in FIG. 1 and Table 8.

TABLE 8

Contact Angle for Solutions of the Present Invention on Polyethylene Microporous Membranes (with PET backing)

| | 0.5% Na-CMC | 1.0% Na-CMC | 2.0% Na-CMC | 3.0% Na-CMC | Averages |
|---|---|---|---|---|---|
| 9.25% n-propanol | | | | 86.0 | 86.0 |
| 10% n-propanol | 85.0 | 95.5 | 88.0 | 91.5 | 90.0 |
| 12.5% n-propanol | 68.5 | 69.0 | | | 68.8 |
| 15% n-propanol | 51.5 | 55.5 | | | 53.5 |

FIG. 1 above shows that in general, when the alcohol content of the solution exceeded 15%, the resistance of the coated samples of the polyethylene microporous membrane started to increase noticeably, indicating that the permeability of the microporous membrane was starting to decrease noticeably. The data in Table 8 show that the contact angle of these solutions was beginning to approach 50°. For the purposes of the contact angle test, an angle of less than 90° is defined as "wetting" with the amount or ease of wetting increasing as the contact angle decreases. This demonstrates that the contact angle which was observed for these solutions—approximately 50°—is an acceptable lower boundary for this property of the solution because it is at this point that the wettability of the adhesive solution has increased enough to cause the solution to start filling the pores of the microporous membrane even though the solution is still actually considered to be wetting the membrane.

On the other end of this spectrum, the data in Table 8 show that the contact angle for solutions made at alcohol contents of 9.25% and 10% had noticeably increased and was approaching the limit of 90° where the solution would be considered to be non-wetting. In some cases, the contact angle actually exceeded 90°. As was discussed in the section "Effect of Alcohol" above, it was observed that solutions of the present invention with an alcohol content of 10% would bead up on the microporous membrane instead of wetting it. The data in Table 8 explain why this was occurring—that is, the contact angle of such a solution is likely to be close to or above 90°, in which case the solution would no longer wet the surface of the membrane. Furthermore, the data in FIG. 1 show that at these levels of alcohol content, the resistance of a strip of polyethylene microporous membrane coated with such a solution was not significantly increased over what is observed without any coating, demonstrating that the adhesive solution had not soaked into the bulk structure of the microporous membrane enough to cause a significant increase in resistance. These data indicate that the contact angle which was observed for these solutions—approximately 90°—is an acceptable upper boundary for this property of the solution because it is at this point that the wettability of the solution becomes enough to allow the solution to wet the surface of the microporous membrane without also starting to penetrate into the bulk structure of the membrane.

A variance from this statement that is seen in FIG. 1 and Table 8 is the case of the 2.0% Na-CMC solution. In that case, the increase in resistance occurred between alcohol contents of 5% and 10% instead of above 15%. However, the data in Table 8 show that a solution of 2% Na-CMC and 10% n-propanol had a contact angle of 88°. This is within the range to consider the solution as sufficiently wetting the microporous membrane. The reason for the excessive increase in resistance is that, as was described above, the samples used in this test were made from single layer strips of a polyethylene microporous membrane. In the practice of the multilayer article of the present invention, a layer of polyimide nonwoven material (layer B) would normally have been placed on top of this membrane after the application of the adhesive. This would have caused a portion of the adhesive to soak into the polyimide nonwoven material. However, in the case of the current test, no layer of polyimide nonwoven material was present, so any adhesive applied would have remained completely on the surface of the polyethylene microporous membrane. This may account for the early increase in resistance seen with the samples in FIG. 1 that were made with a 2% Na-CMC solution. Had a layer of polyimide nonwoven material with the properties of the successful examples described elsewhere in the Discussion of Results been applied to membranes coated with this solution while the contact angle was within the range defined previously, it is likely that the multilayer article so formed would have been an additional successful example of the present invention.

Given these data, it can be concluded that successful adhesive solutions for the multilayer article of the present invention will have a contact angle on the microporous membrane in the range of 50° to 90°. As long as these limits and the other characteristics described throughout the Discussion of Results section are satisfied, the concentration of the Na-CMC may be varied as needed.

We claim:

1. A heat-resistant separator comprising a porous film, a polymeric fibrous web situated in a face to face relationship with the porous film, and an adhesive binder layer located between the porous film and the fibrous layer, said binder layer comprising an adhesive and covering at least a portion of the surface of the porous film that faces the fibrous web, wherein;
    the fibrous layer comprises fibers having diameters in the range of 1-3000 nm and a mean fiber diameter in the range of 1-3000 nm, a majority of said fibers manufactured of a polyimide,
    the amount of adhesive present between the porous film and the fibrous web in the final product is within the range of 0.30 grams per square meter of covered surface of porous film to 0.90 grams per square meter of covered surface of porous film,
    the mean flow pore size of the fibrous layer is 1.5 µm or greater.

2. The separator of claim 1 in which the amount of adhesive present between the porous film and the fibrous web in the final product is within the range of 0.40 grams per square meter of covered surface of porous film to 0.90 grams per square meter of covered surface of porous film.

3. The separator of claim 1 wherein the adhesive is selected from the group consisting of polyvinylidene fluoride, polyvinylidene fluoride-co-hexafluoropropylene, polymethyl methacrylate, polyacrylonitrile, polyvinylpyrrolidone, polyvinyl acetate, polyethylene oxide, cellulose acetate, polyvinyl alcohol, carboxymethyl cellulose, sodium carboxymethyl cellulose, a meta-aramid, a para-aramid, styrene butadiene rubber, and mixtures thereof.

4. A process for preparing a heat-resistant separator comprising the steps of
    (i) providing a porous film and a polymeric fibrous web,
    (ii) coating an adhesive solution layer comprising an adhesive and a solvent onto a surface of the porous film, and covering at least a portion of the surface of the porous film,
    (iii) placing the web onto the surface of the porous film that contains the adhesive solution to form a film plus fibrous web laminate with an adhesive solution located in between the faces of the film and the fibrous web,
    (iv) applying sufficient heat to the laminate to remove the solvent, wherein;
        the fibrous web comprises fibers having diameters in the range of 1-3000 nm, a majority of said fibers manufactured of a polyimide,
        the porosity of the fibrous web prior to step (iii) is greater than or equal to 65%,
        the mean flow pore size of the fibrous web prior to step (iii) is 1.5 microns or greater,
        the Frazier air permeability of the fibrous web prior to step (iii) is 2.0 cfm/ft$^2$ or greater,
        the coating thickness ratio of the adhesive solution layer prior to step (iv) is greater than or equal to 1.0 and less than or equal to 2.0, and
    the adhesive solution layer comprises the adhesive at a concentration of 1 percent or greater by weight of adhesive solution, a C3 or higher alcohol that is not isopropanol and a remainder of deionized water such that the contact angle of the adhesive solution with respect to the microporous membrane is within the range of 50°-90°.

5. The process of claim 4 wherein the adhesive is selected from the group consisting of polyvinylidene fluoride, polyvinylidene fluoride-co-hexafluoropropylene, polymethyl methacrylate, polyacrylonitrile, polyvinylpyrrolidone, polyvinyl acetate, polyethylene oxide, cellulose acetate, polyvinyl alcohol, carboxymethyl cellulose, a meta-aramid, a para-aramid, styrene butadiene rubber, and mixtures thereof.

6. A heat-resistant separator made by the process of claim 4 in which the adhesive is sodium carboxymethylcellulose.

7. An electrochemical device comprising a cathode, an anode and a separator interposed between the cathode and the anode, wherein the separator is the separator of claim 1.

8. The electrochemical device according to claim 7, wherein the electrochemical device is a lithium secondary battery.

* * * * *